Figure 1:
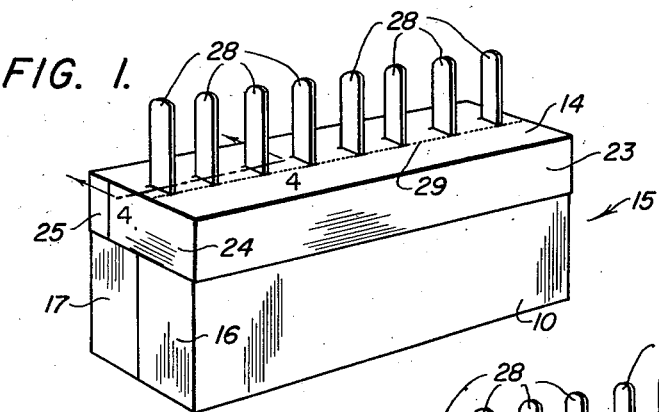

Dec. 23, 1952 W. HAMMOND 2,622,784
DISPOSABLE CARTON MOLD BOX FOR FROZEN FOOD CONFECTIONS
Filed Aug. 9, 1949 2 SHEETS—SHEET 1

Inventor:
WEST HAMMOND
Attorneys.

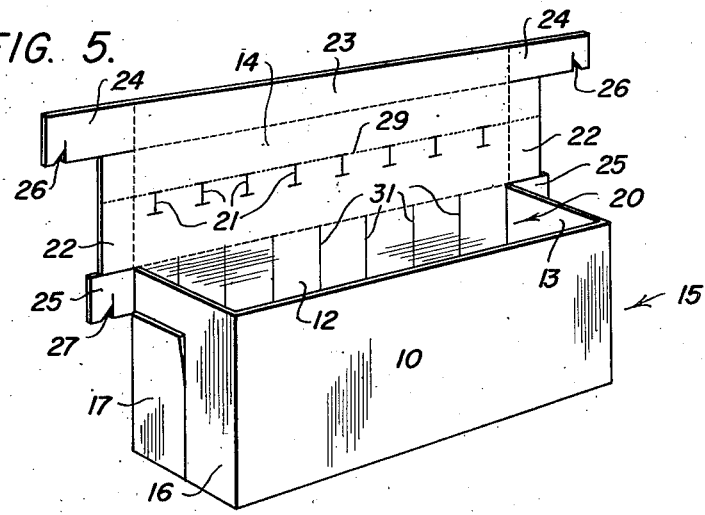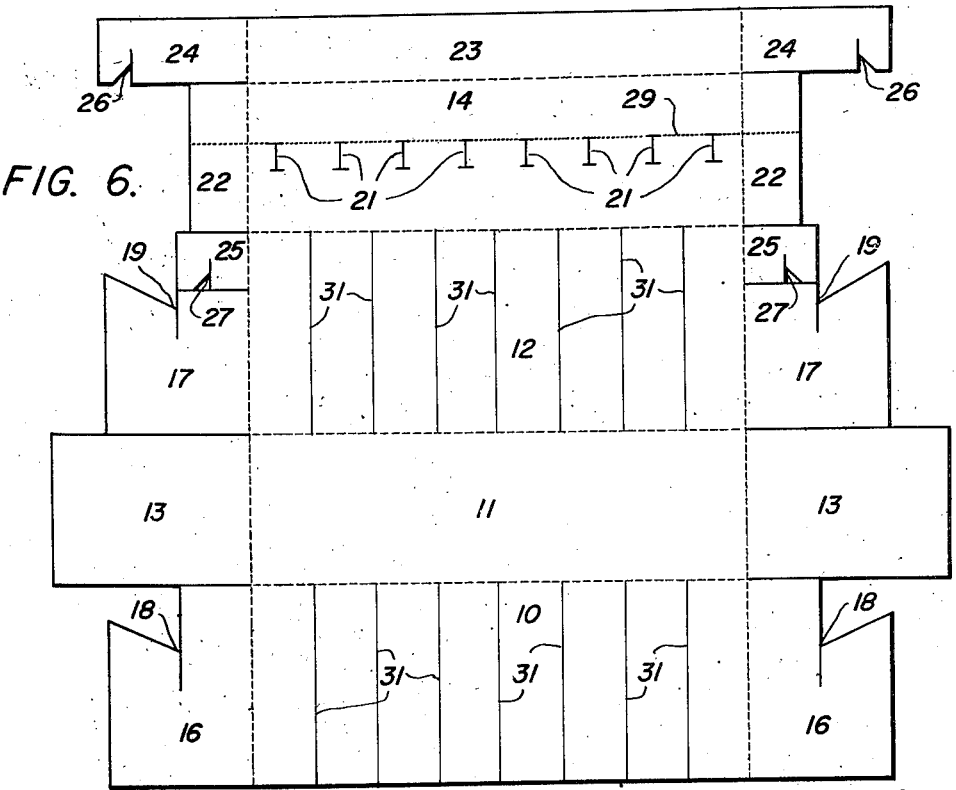

Patented Dec. 23, 1952

2,622,784

UNITED STATES PATENT OFFICE 2,622,784

DISPOSABLE CARTON MOLD BOX FOR FROZEN FOOD CONFECTIONS

West Hammond, Salt Lake City, Utah

Application August 9, 1949, Serial No. 109,264

8 Claims. (Cl. 229—36)

This invention relates to mold boxes for use in the manufacture of frozen food confections, such as ice cream, frozen custard, sherbet, etc., especially when frozen on a stick which serves as a handle during the consumption of the confection.

In the manufacture of frozen food confections equipped with sticks as handles to facilitate consumption of the product, metal or plastic molds are customarily employed for the freezing of a relatively large block of the confection. Wood sticks or the like are inserted at spaced locations in the block, and the individual products are formed by slicing the block so that a number of smaller blocks, each equipped with a handle, are produced.

In the removal of the frozen block from the mold, it is almost invariably necessary to heat the mold box somewhat to melt the adhering surfaces of the block. This not only takes time and brings about a certain loss of frozen material, but requires a re-chilling of the frozen block. Furthermore, in instances where the mold box is equipped with a perforate cover through which sticks are inserted into a partially frozen mixture in the mold box, it is often difficult to remove the cover following the final freezing of the mixture.

In accordance with the present invention, I provide an improved mold box for the manufacture of blocks of frozen confections and of individual frozen confections on a stick, wherein the above defects are overcome and certain advantages, hereinafter mentioned, are obtained.

I utilize a disposable folding box or carton of liquid-proofed paperboard or the like as the mold within which a block of the confection is frozen. The box or carton is formed so that sticks may be conveniently and effectively positioned in the block through the cover in the required spaced relationship, and so that the mold may be quickly and easily removed without application of heat and without loss of frozen material. The frozen block as released from the mold requires no rechilling of any kind, and individual sections severed from the block may be immediately dipped in a coating material or bagged.

Principal objects of the invention are:

To provide a mold box of the type concerned which will effectively produce the desired products and yet be disposable following discharge of contents, thereby eliminating the usual washing and sterilizing operations, and making for greater sanitation in the manufacturing of the products.

To provide such a mold box which may be utilized as a merchandise carton from factory to retailer, thereby eliminating considerable handling of the products prior to sale to the consumer.

To provide a one-piece, disposable mold box for the manufacture of frozen confections on sticks.

To provide a merchandise box or carton for ice cream products wherein fresh fruits, cookies, and other edible solids may be incorporated in the products to best advantage.

To provide an easily opened and easily stripped mold box for ice cream products, by the use of which the customary re-chilling operation is eliminated.

To provide a distinctive merchandise carton for frozen confections on sticks, enabling retail dispensing of the confections directly from the mold box.

To provide the above by a construction which is capable of high-speed, inexpensive production on conventional automatic paper-box-making machinery.

In the attainment of these objects, I form the mold box from a suitably cut and scored blank of folding paper box board which has been waterproofed in customary manner, as by the application of paraffin thereto. The set-up box is preferably of rectangular configuration, having an integrally-formed hinge cover through which suitably placed perforations provide for the introduction and positive grip of a plurality of sticks in mutually spaced relationship. The cover fits over, rather than into, the box proper, and is advantageously locked in closed position by locking flaps specially provided at opposite ends of the box.

Further objects and features of the invention will become apparent from the following detailed description of the presently preferred specific embodiment thereof illustrated in the accompanying drawings by way of exemplifying the generic concepts hereinafter claimed.

Figure 2:
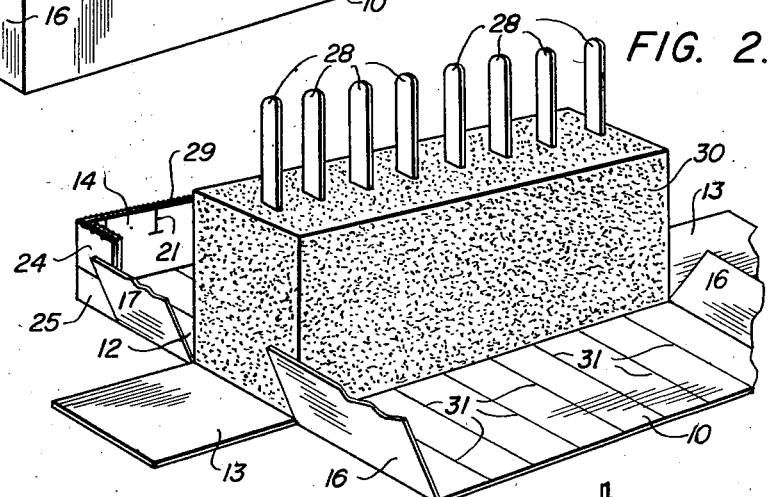
Figure 3:
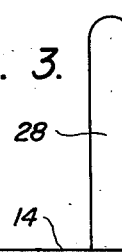
Figure 4:
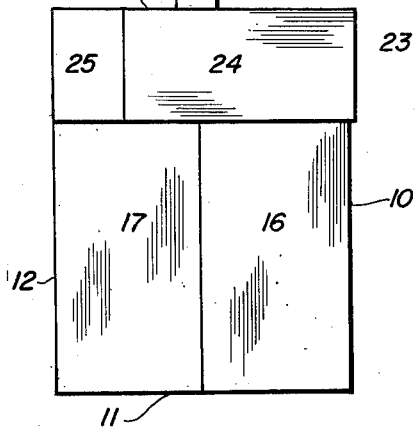
Figure 4:
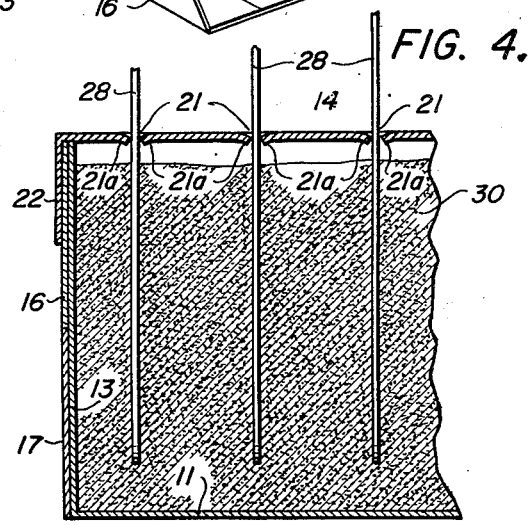

In the drawings:

Fig. 1 represents a perspective view of a mold box constructed in accordance with the invention, the same being filled and closed and fitted with sticks as it appears both before and after the final freezing operation;

Fig. 2, a perspective view of the mold box as torn open for the discharge of contents following the final freezing operation;

Fig. 3, an end elevation of the closed mold box of Fig. 1 drawn to an enlarged scale;

Fig. 4, a fragmentary longitudinal section taken on the line 4—4 of Fig. 1 drawn to the enlarged scale of Fig. 3;

Fig. 5, a front perspective view of the box as set-up for the reception of a soft-frozen mix, with the cover open; and Fig. 6, a plan view of the cut and scored blank of folding box board material used in the construction of the mold box of the foregoing figures.

Referring to the drawings: the illustrated embodiment of the invention is set-up, in a manner customary to the folding box art, from the prepared blank of folding box board material shown in Fig. 6. Such material is ordinarily a heavy paperboard stock, and is, for the present purpose, rendered liquid-proof in some suitable manner, as by the coating thereof with paraffin.

The blank of Fig. 6 is cut and scored to provide front wall panel 10, bottom panel 11, back wall panel 12, opposite end wall panels 13, respectively, and cover, or top panel 14, as the main wall-forming components, the same making up a carton of rectangular formation, as illustrated.

For securing the box proper in set-up position, as shown at 15 in Fig. 5, interengaging, locking flaps 16 and 17 extend from opposite ends of front wall panel 10 and back wall panel 12, respectively. Such locking flaps 16 and 17 are provided with interlocking notched and slit formations 18 and 19, respectively, of conventional configuration, which interengage in the usual manner.

In this set-up condition of the box proper 15, as illustrated in Fig. 5, the end wall panels 13 are folded upwardly within the box from their joinder with bottom panel 11, and serve to sheath the surface irregularities of the respective pairs of interlocked end flaps 16 and 17. Accordingly, the box proper 15 has a smooth interior molding surface over all.

The cover or top panel 14 hinges longitudinally along its joinder with the upper edge of back wall panel 12, and is provided with means for securing it tightly in place over the opening 20 of the box proper 15. It is provided, further, with sets 21 of cut or perforate lines, which define respective potential insert openings for the placement of sticks in the mold box after the cover is closed. Such lines 21 preferably define I-configurations, so that the inserted sticks will be tightly held by the opposite flap portions 21a formed between the bars of the I, see especially Fig. 4. However, other configurations, accomplishing a similar stick-holding function, may be utilized.

I have found the following described securing means for the cover to be especially advantageous, in that they provide tight and positive securement of the cover over the box proper without the insertion of any flaps or tabs within the closed mold box and without gluing. Thus, the interior surfaces of the closed mold box are smooth and regular, as they should be to produce completely symmetrical frozen products, and the boxes may be shipped in flat blank form to the location of use.

Extending integrally from opposite ends of the cover or top panel 14 are respective flaps 22, which fold downwardly against the outer faces of the respective pairs of interlocked end flaps 16 and 17, outside the box proper 15. A similar longitudinal flap 23 extends integrally along the forward edge of such panel 14, and folds downwardly against the upper outer margin of front wall panel 10, also outside the box proper 15.

For securing the cover panel and the so-folded flaps in the positions thus assumed, each end of the box is equipped with a set of interlocking securement flaps 24 and 25. The flaps 24 extend integrally from respectively opposite ends of longitudinal flap 23, while the flaps 25 extend integrally from the upper longitudinal margin of back wall panel 12. Such flaps 25 are cut from the upper portions of the respective locking flaps 17.

The securement flaps 24 and 25 are preferably provided with interlocking notched and slit formations 26 and 27, respectively, somewhat similar to those previously indicated 18 and 19, and, when interlocked in the manner shown in Figs. 1 and 3, serve to keep the mold box tightly closed.

In use, the box proper 15 is first set up, in the manner explained above, to the open condition of Fig. 5. A soft-frozen mixture is then inserted in any suitable manner, until such box proper is filled to the proper level. Whereupon, the cover is closed and secured in position in the manner explained above. Sticks 28 are then pushed through the perforate I-openings 21 in the cover, to the proper depth, against frictional resistance of the flap portions 21a. They are held at the proper depth by the resistance and spring-like action of such flap portions. The fully packed and prepared mold is then placed in a freezer for hard-freezing in the customary manner.

The box is especially prepared for quick and easy opening following the freezing operation, by the provision of a longitudinal perforate line 29 extending from end to end of the cover or top panel 14, and, advantageously, also across the lengths of opposite end flaps 22, so as to intersect the perforate I-openings 21 along the series thereof.

In the opening of the box, the retailer of the frozen confection need merely tear or cut the cover or top panel 14 and the end flaps 22 along the perforate line 29, and either disengage or tear the sets of interlocked cover securement flaps 24 and 25 and the sets of interlocked box proper securement flaps 16 and 17, whereby the mold box is completely opened, leaving the frozen block 30 free and resting on the bottom panel 11 as a tray, for slicing into individual frozen confections, each equipped with a stick 28 as a handle.

If desired, the inner faces of front wall panel 10 and back wall panel 12 may be provided with a series of scored or otherwise marked transverse lines 31, indicating where dividing cuts should be made in the block 30. In some instances, it may be desirable for the retailer to cut off individual frozen confections from the cartoned block from time to time as they are sold, thereby leaving the unsold portion of the block protected. In such instances, lines 31 could be applied to the outer face of the cover or top panel 14, and the retailer would leave the carton as a whole intact, merely cutting through it and the block, together, on the particular marking line or lines concerned.

In both cases noted above, the individual frozen confections may be inserted in respective bags following severance from the block, so that sales may be made in the manner now customary for such confections. Furthermore, the individual frozen confections may be dipped in chocolate or other coatings prior to bagging.

With the carton of the invention serving as a mold box in the production of the product, the soft-frozen ice cream is effectively introduced into the box proper 15 through the opening 20. It should be noted that such opening 20 is co-extensive in area with the largest wall panel area of the carton, and that the final product may be a single brick of ice cream, or a block severable into a plurality of frozen confections each equipped with a stick as a handle.

Whereas this invention is here illustrated and described with respect to a presently preferred specific embodiment thereof, it should be understood that various changes may be made therein and various other embodiments may be constructed, on the basis of the teachings hereof, by those skilled in the art without departing from the protective scope of the following claims.

I claim:

1. A disposable carton mold box for the production of frozen food confections on sticks, comprising a box proper and a cover therefor formed of folding box board, the said cover being integrally hinged to said box proper and provided with a plurality of substantially closed perforations bordered by depressible flap members, for the partial introduction of sticks into said box proper against frictional holding resistance, and a perforate line extending from end to end of said cover and interconnecting the said plurality of stick-receiving perforations, to facilitate tearing and stripping of the carton from the frozen block.

2. The structure recited in claim 1, wherein the cover embodies a closure flap for overlapping the box proper exteriorly thereof, a pair of securement flaps extending from opposite ends of said closure flap, and a pair of securement flaps extending from opposite ends of that wall panel of the box proper which lies opposite said closure flap, the said pairs of securement flaps being configurated for interlocking engagement in the securement of the carton in closed condition.

3. A disposable cover for the box proper of a mold used in the production of frozen food confections on sticks, comprising a cover panel, closure flaps extending from said cover panel and arranged to overlap the mold box proper exteriorly thereof, said cover panel being provided with a plurality of substantially closed perforations bordered by depressible flap members, for the partial introduction of sticks into said mold box proper against frictional holding resistance, and a perforate line extending from end to end of the cover, including said cover panel and continuing through adjacent closure flaps, so as to interconnect the said plurality of stick-receiving perforations and facilitate tearing and stripping of the cover from the frozen contents of said mold.

4. A box blank foldable into a disposable carton mold box for the production of frozen food confections on sticks, the said box blank comprising a front wall panel; a bottom panel; a back wall panel, opposite end wall panels; a cover panel; a pair of securement flaps extending from opposite ends of said front wall panel; a pair of securement flaps extending from opposite ends of said back wall panel, said pairs of flaps being configurated for interlocking engagement in the securement of the carton in set-up condition; a front closure flap extending from and along the forward edge of said cover panel; a pair of side closure flaps extending from opposite ends of said cover panel; a pair of cover securement flaps extending from opposite ends of said front closure flap; and a pair of cover securement flaps extending from opposite ends of said back wall panel, said pairs of cover securement flaps being configurated for interlocking engagement in the closure of the carton; a plurality of substantially closed perforations bordered by depressible flap members defined in said cover panel by respective sets of perforate lines, affording partial introduction of sticks into the carton against frictional holding resistance; and a perforate line extending longitudinally of said cover panel from end to end thereof and across the said pair of side closure flaps, said perforate line interconnecting the said plurality of stick-receiving perforations to facilitate tearing and stripping of the carton from the frozen block.

5. The structure recited in claim 4, wherein the inner faces of the front and back wall panels are provided with a plurality of transverse lines between respective stick-receiving perforations, demarking lines of severance.

6. The structure recited in claim 4, wherein the pair of carton securement flaps and the pair of cover securement flaps are provided with notched and cut interlocking formations.

7. A blank of folding box board cut and scored for folding into a carton, said blank comprising a front wall panel; a bottom panel; a back wall panel; opposite end wall panels; a cover panel; a pair of securement flaps extending from opposite ends of said front wall panel; a pair of securement flaps extending from opposite ends of said back wall panel, said pairs of flaps being configurated for interlocking engagement in the securement of the carton in set-up condition; a front closure flap extending from and along the forward edge of said cover panel; a pair of side closure flaps extending from opposite ends of said cover panel; a pair of cover securement flaps extending from opposite ends of said front closure flap; and a pair of cover securement flaps extending from opposite ends of said back wall panel, said pairs of cover securement flaps being configurated for interlocking engagement in the closure of the carton.

8. A blank of folding box board cut and scored for folding into a carton, said blank including a cover panel; a plurality of substantially closed perforations bordered by depressible flap members defined in said cover panel by respective sets of perforate lines, affording partial introduction of sticks into the carton against frictional holding resistance; and a perforate line extending longitudinally of said cover panel from end to end thereof, said perforate line interconnecting the said plurality of stick-receiving perforations, so the carton may be torn along said line.

WEST HAMMOND.

REFERENCES CITED

The following references are of record in the file of this patent:

UNITED STATES PATENTS

| Number | Name | Date |
|---|---|---|
| 776,002 | Web | Nov. 29, 1904 |
| 1,296,158 | Bonham | Mar. 4, 1919 |
| 1,991,640 | Taylor | Feb. 19, 1935 |
| 2,027,791 | Schrager | Jan. 14, 1936 |
| 2,045,183 | Fowle | June. 23, 1936 |
| 2,091,126 | Speer | Aug. 24, 1937 |
| 2,124,699 | Harrington | July 26, 1938 |
| 2,147,135 | Addis et al. | Feb. 14, 1939 |
| 2,279,381 | Richardson | Apr. 14, 1942 |